US012803714B2

(12) United States Patent
Kim

(10) Patent No.: US 12,803,714 B2
(45) Date of Patent: Nov. 17, 2026

(54) METHOD AND APPARATUS FOR DETERMINING HARQ PROCESS ID TO PERFORM DISCONTINUOUS TRANSMISSION IN MOBILE WIRELESS COMMUNICATION SYSTEM

(71) Applicants: BLACKPIN Inc., Seoul (KR); Soenghun Kim, Hanam-si (KR)

(72) Inventor: Soenghun Kim, Hanam-si (KR)

(73) Assignees: BLACKPIN INC., Seoul (KR); Soenghun Kim, Hanam-si (KR)

( * ) Notice: Subject to any disclaimer, the term of this patent is extended or adjusted under 35 U.S.C. 154(b) by 324 days.

(21) Appl. No.: 18/625,233

(22) Filed: Apr. 3, 2024

(65) Prior Publication Data

US 2024/0340892 A1 Oct. 10, 2024

(30) Foreign Application Priority Data

Apr. 7, 2023 (KR) ........................ 10-2023-0045895

(51) Int. Cl.
*H04L 1/1812* (2023.01)
*H04W 72/1268* (2023.01)

(52) U.S. Cl.
CPC ....... *H04L 1/1812* (2013.01); *H04W 72/1268* (2013.01)

(58) Field of Classification Search
CPC ...... H04L 1/1812–1819; H04W 72/12; H04W 72/1263–1268; H04W 72/1268
See application file for complete search history.

(56) References Cited

U.S. PATENT DOCUMENTS

| | | | | |
|---|---|---|---|---|
| 11,147,056 B2 * | 10/2021 | Babaei | .................. | H04W 72/23 |
| 12,520,304 B2 * | 1/2026 | Bae | ........................ | H04L 1/1822 |
| 2019/0268935 A1 * | 8/2019 | Talarico | ................ | H04L 1/1822 |
| 2020/0021402 A1 * | 1/2020 | Xu | ........................ | H04L 1/1887 |
| 2021/0007135 A1 * | 1/2021 | Sun | ........................ | H04W 74/08 |
| 2021/0345395 A1 * | 11/2021 | Chatterjee | ............. | H04W 76/27 |
| 2022/0046677 A1 * | 2/2022 | Talarico | ................ | H04W 72/23 |
| 2022/0095360 A1 * | 3/2022 | Kim | .................. | H04W 72/0446 |

(Continued)

OTHER PUBLICATIONS

3GPP TS 38.321 V17.4.0 (Mar. 2023); Technical Specification; 3rd Generation Partnership Project; Technical Specification Group Radio Access Network; NR; Medium Access Control (MAC) protocol specification (Release 17).

(Continued)

*Primary Examiner* — Brendan Y Higa
(74) *Attorney, Agent, or Firm* — Nicholas Park

(57) ABSTRACT

A method and apparatus for enhanced discontinuous transmission is provided. Method for discontinuous transmission includes receiving a RRC message from the base station and performing uplink transmission for configured grants during a first transmission period based on presence of a first information in the RRC message. The RRC message includes one or more configured grant parameters. To perform uplink transmission for configured grants, HARQ process ID is determined based on HARQ_PID_Determination_mode_1 if a second information is absent in the configured grant configuration and based on HARQ_PID_Determination_mode_2 if a second information is present in the configured grant configuration.

18 Claims, 7 Drawing Sheets

(56) References Cited

U.S. PATENT DOCUMENTS

| | | | | |
|---|---|---|---|---|
| 2022/0116988 | A1* | 4/2022 | Shi | H04L 1/08 |
| 2022/0286239 | A1* | 9/2022 | Lee | H04L 1/1854 |
| 2022/0338241 | A1* | 10/2022 | Chin | H04L 1/1812 |
| 2024/0014948 | A1* | 1/2024 | Park | H04W 52/0248 |
| 2024/0283577 | A1* | 8/2024 | Al | H04L 1/1854 |
| 2024/0284446 | A1* | 8/2024 | Yang | H04W 72/232 |
| 2025/0344207 | A1* | 11/2025 | Tsai | H04W 72/1268 |
| 2025/0351125 | A1* | 11/2025 | Xu | H04W 72/0446 |
| 2025/0358052 | A1* | 11/2025 | Nagano | H04L 1/1812 |

OTHER PUBLICATIONS

3GPP TS 38.331 V17.4.0 (Mar. 2023); Technical Specification; 3rd Generation Partnership Project; Technical Specification Group Radio Access Network; NR; Radio Resource Control (RRC) protocol specification (Release 17).

Qualcomm Incorporated, "DRX enhancements for XR," 3GPP TSG-RAN WG2 Meeting #120, Toulouse France, R2-2211180, Nov. 14-18, 2022.

ZTE Corporation et al., "Scheduling enhancements for XR," 3GPP TSG-RAN2#120, Toulouse, France, R2-2211527, Nov. 14-18, 2022.

Nokia et al., "BS Tables for XR," 3GPP TSG-RAN WG2 Meeting #120, Toulouse, France, R2-2211600, Nov. 14-18, 2022.

Nokia et al., "XR Capacity Enhancements," 3GPP TSG-RAN WG2 Meeting #120, Toulouse, France, R2-2211601, R2-2209559, Nov. 14-18, 2022.

Futurewei, "Discussion on BSR enhancements," 3GPP TSG-RAN WG2 Meeting #120, Toulouse, France, R2-2212517, Nov. 14-18, 2022.

Ericsson, "Discussion on Scheduling enhancements," 3GPP TSG-RAN WG2 #120, Toulouse, France, R2-2212890, Nov. 14-18, 2022.

Huawei et al., "Further discussion on C-DRX enhancements for XR," 3GPP TSG-RAN WG2 Meeting #121, Athens, Greece, R2-2300118, Feb. 27-Mar. 3, 2023.

3GPP TR 38.835 V1.0.1 (Feb. 2023); Technical Report; 3rd Generation Partnership Project; Technical Specification Group Radio Access Network; NR; Study on XR enhancements for NR (Release 18), R2-2300152.

Qualcomm Incorporated, "Discussion on PDU discard," 3GPP TSG-RAN WG2 Meeting #121, R2-2300186, Athens, Feb. 27-Mar. 4, 2023.

Qualcomm Incorporated, "DRX enhancements for XR," 3GPP TSG-RAN WG2 Meeting #121, Athens, R2-2300188, Feb. 27-Mar. 4, 2023.

Intel Corporation, "RAN2 implications on PDU Set and Data Burst based on SA2 inputs," 3GPP TSG RAN WG2 Meeting #121, Athens, Greece, R2-2300428, Feb. 27-Mar. 3, 2023.

Ericsson, "Discussion on PDU Discard," 3GPP TSG-RAN WG2 #121, Athens, Greece, R2-2301509, Feb. 27-Mar. 3, 2023.

Ericsson, "Discussion on PDU Prioritization," 3GPP TSG-RAN WG2 #121, Athens, Greece, R2-2301511, Feb. 27-Mar. 3, 2023.

* cited by examiner

METHOD AND APPARATUS FOR DETERMINING HARQ PROCESS ID TO PERFORM DISCONTINUOUS TRANSMISSION IN MOBILE WIRELESS COMMUNICATION SYSTEM

CROSS-REFERENCE TO RELATED APPLICATION

This application claims priority to and the benefit of Korean Patent Application No. 10-2023-0045895, filed on Apr. 7, 2023, the disclosure of which is incorporated herein by reference in its entirety.

BACKGROUND

Technical Field

The present disclosure relates to enhanced discontinuous transmission for extended reality in a mobile communication system. More specifically, the present disclosure relates to determining HARQ process ID to perform discontinuous transmission in mobile wireless communication system.

Related Art communication systems, the 5th generation (5G) system is being developed. For the sake of high data rate, 5G system introduced millimeter wave (mmW) frequency bands (e.g. 60 GHz bands). In order to increase the propagation distance by mitigating propagation loss in the 5G communication system, various techniques are introduced such as beamforming, massive multiple-input multiple output (MIMO), full dimensional MIMO (FD-MIMO), array antenna, analog beamforming, and large-scale antenna. In addition, base station is divided into a central unit and plurality of distribute units for better scalability.

Extended Reality (XR) refers to all real-and-virtual combined environments and human-machine interactions generated by computer technology and wearables. XR is an umbrella term for different types of realities.

During a XR service, huge amount of Data Bursts may be generated and transmitted over NR downlink and uplink. It may cause excessive battery consumption and control channel shortage due to frequent data transfer.

To make the XR services sustainable in NR network, it is necessary to reduce the battery consumption and control channel usage.

As a method to reduce battery consumption, discontinuous reception is widely used. In order to efficiently provide XR services, it is necessary to improve discontinuous reception.

SUMMARY

Aspects of the present disclosure are to enhance the discontinuous transmission operation. The method includes receiving a RRC message from the base station and performing uplink transmission for configured grants during a first transmission period based on presence of a first information in the RRC message. The RRC message includes one or more configured grant parameters. To perform uplink transmission for configured grants, HARQ process ID is determined based on HARQ_PID_Determination_mode_1 if a second information is absent in the configured grant configuration and based on HARQ_PID_Determination_mode_2 if a second information is present in the configured grant configuration.

DETAILED DESCRIPTION

Hereinafter, embodiments of the present invention will be described in detail with reference to the accompanying drawings. In addition, in the description of the present invention, if it is determined that a detailed description of a related known function or configuration may unnecessarily obscure the gist of the present invention, the detailed description thereof will be omitted. In addition, the terms to be described later are terms defined in consideration of functions in the present invention, which may vary according to intentions or customs of users and operators. Therefore, the definition should be made based on the content throughout this specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the latest 3GPP standards are used for convenience of explanation. However, the present disclosure is not limited by use of these terms and definitions and other arbitrary terms and definitions may be employed instead.

In this disclosure, means and apparatus to reduce the power consumption during XR service are provided.

Figure 1A:
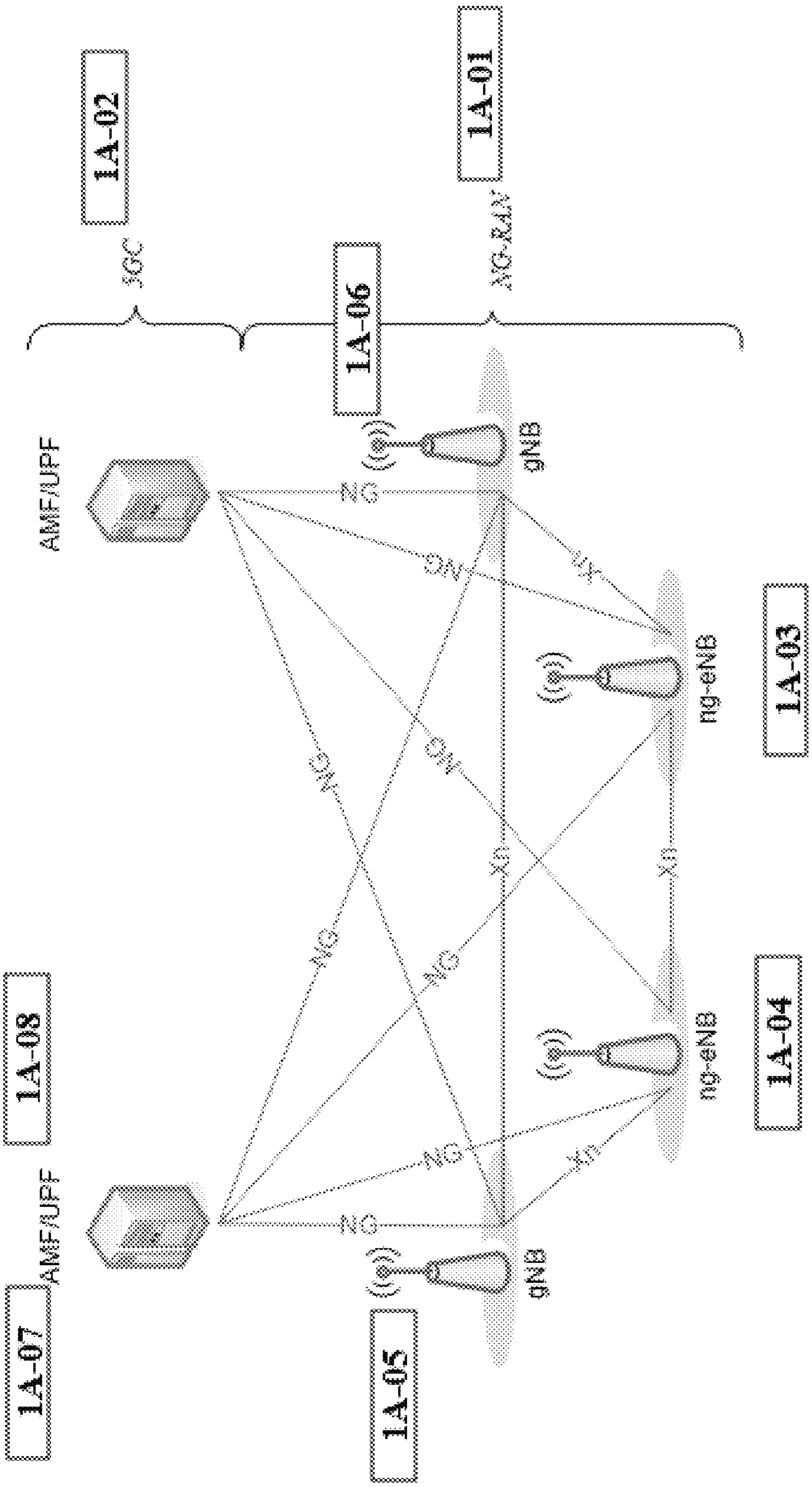
FIG. 1A is a diagram illustrating the architecture of an 5G system and a NG-RAN.

FIG. 1A is a diagram illustrating the architecture of an 5G system and a NG-RAN to which the disclosure may be applied.

5G system consists of NG-RAN (1A-01) and 5GC (1A-02). An NG-RAN node is either gNB (providing NR user plane and control plane protocol terminations towards the terminal) or an ng-eNB (providing E-UTRA user plane and control plane protocol terminations towards the terminal).

The gNBs (1A-05 or 1A-06) and ng-eNBs (1A-03 or 1A-04) are interconnected with each other by means of the Xn interface. The gNBs and ng-eNBs are also connected by means of the NG interfaces to the 5GC, more specifically to the AMF (Access and Mobility Management Function) and to the UPF (User Plane Function). AMF (1A-07) and UPF (1A-08) may be realized as a physical node or as separate physical nodes.

A gNB (1A-05 or 1A-06) or an ng-eNBs (1A-03 or 1A-04) hosts the functions listed below.

Functions for Radio Resource Management such as Radio Bearer Control, Radio Admission Control, Connection Mobility Control, Dynamic allocation of resources to UEs in uplink, downlink and sidelink(scheduling); and IP and Ethernet header compression, uplink data decompression and encryption of user data stream; and Selection of an AMF at UE attachment when no routing to an MME can be determined from the information provided by the terminal; and Routing of User Plane data towards UPF; and Scheduling and transmission of paging messages; and Scheduling and transmission of broadcast information (originated from the AMF or O&M); and Measurement and measurement reporting configuration for mobility and scheduling; and Session Management; and QoS Flow management and mapping to data radio bearers; and Support of UEs in RRC_INACTIVE state; and Radio access network sharing; and Tight interworking between NR and E-UTRA; and Support of Network Slicing.

The AMF (1A-07) hosts the functions such as NAS signaling, NAS signaling security, AS security control, SMF selection, Authentication, Mobility management and positioning management.

The UPF (1A-08) hosts the functions such as packet routing and forwarding, transport level packet marking in the uplink, QoS handling and the downlink, mobility anchoring for mobility etc.

Figure 1B:
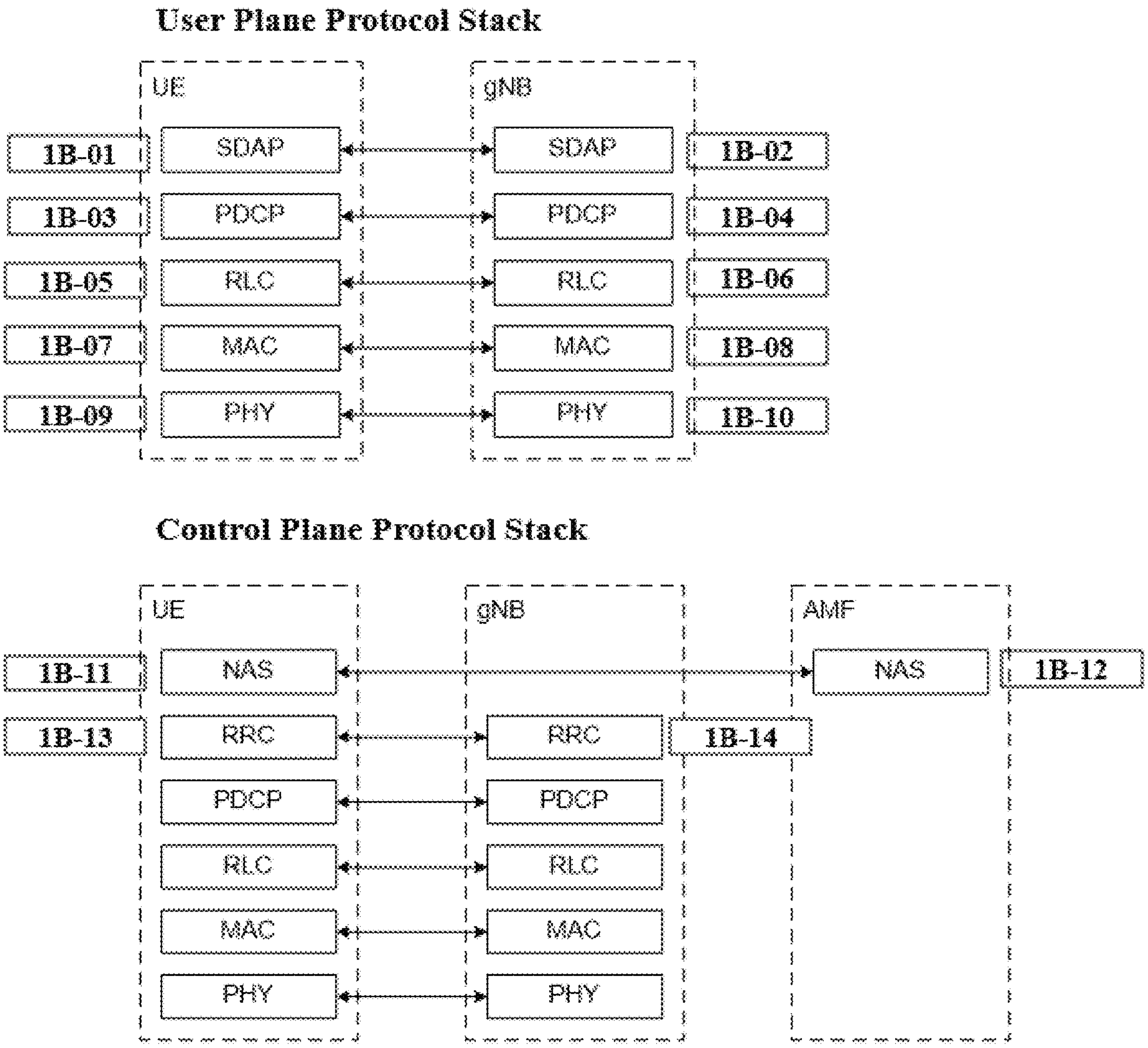
FIG. 1B is a diagram illustrating a wireless protocol architecture in an 5G system.

FIG. 1B is a diagram illustrating a wireless protocol architecture in an 5G system to which the disclosure may be applied.

User plane protocol stack consists of SDAP (1B-01 or 1B-02), PDCP (1B-03 or 1B-04), RLC (1B-05 or 1B-06), MAC (1B-07 or 1B-08) and PHY (1B-09 or 1B-10). Control plane protocol stack consists of NAS (1B-11 or 1B-12), RRC (1*b*-13 or 1*b*-14), PDCP, RLC, MAC and PHY.

Each protocol sublayer performs functions related to the operations listed below.

NAS: authentication, mobility management, security control etc

RRC: System Information, Paging, Establishment, maintenance and release of an

RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc.

SDAP: Mapping between a QoS flow and a data radio bearer, Marking QoS flow ID (QFI) in both DL and UL packets.

PDCP: Transfer of data, Header compression and decompression, Ciphering and deciphering, Integrity protection and integrity verification, Duplication, Reordering and in-order delivery, Out-of-order delivery etc.

RLC: Transfer of upper layer PDUs, Error Correction through ARQ, Segmentation and re-segmentation of RLC SDUs, Reassembly of SDU, RLC re-establishment etc.

MAC: Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc.

PHY: Channel coding, Physical-layer hybrid-ARQ processing, Rate matching, Scrambling, Modulation, Layer mapping, Downlink Control Information, Uplink Control Information etc.

Figure 1C:
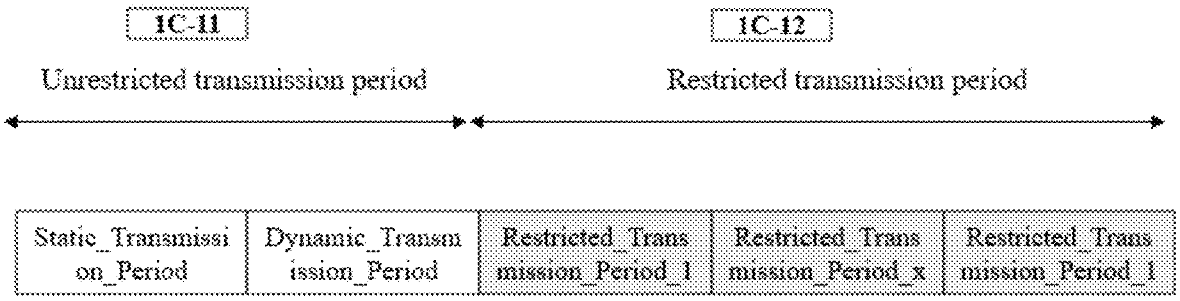
FIG. 1C is a diagram illustrating operation of discontinuous transmission according to an embodiment of the present invention.

FIG. 1C illustrates discontinuous transmission.

To provide the power consumption reduction, minimizing the duration for uplink transmission is required. To maintain performance, transmission of necessary uplink signal during an appropriate time point is also required. To strike the balance between them, various transmission periods and corresponding uplink signals are introduced as below.

In time domain, a time unit belongs either to an unrestricted transmission period or an restricted transmission period. The time unit can be a slot or a subframe or a symbol.

The unrestricted transmission period further comprises following periods.

Static_Transmission_Period

During this period, the terminal performs transmissions for the following uplink signals.

- Persistent/Periodic CSI (P-CSI) on PUCCH, Semi-Persistent CSI (SP-CSI) on PUCCH, SP-CSI on PUSCH, Aperiodic CSI (AP-CSI).
- Persistent/Periodic SRS (P-SRS) on PUSCH, Semi-Persistent SRS (SP-SRS) on PUSCH, Aperiodic SRS (AP-SRS) on PUSCH.
- HARQ feedback on PUCCH.
- HARQ feedback on PUSCH.
- PUSCH transmission based on configured grant.
- PUSCH transmission based on dynamic grant.
- Periodic Configured Grant Indication (P-CGI) on PUCCH.
- P-CGI on PUSCH.

Dynamic_Transmission_Period

During this period, the terminal performs transmissions for the following uplink signals. The terminal minimize transmission on PUCCH by not transmitting P-CSI on PUCCH and SP-CSI on PUCCH. The terminal performs PUCCH transmission for P-CGI and HARQ feedback that are more important for maintaining performance.

- SP-CSI on PUSCH, AP-CSI on PUSCH.
- P-SRS on PUSCH, SP-SRS on PUSCH, AP-SRS on PUSCH.
- HARQ feedback on PUCCH.
- HARQ feedback on PUSCH.
- PUSCH transmission based on configured grant.
- PUSCH transmission based on dynamic grant.
- Periodic Configured Grant Indication (P-CGI) on PUCCH.
- P-CGI on PUSCH.

The restricted transmission period further comprises following periods.

Restricted_Transmission_Period_1

During this period, the terminal performs transmission for restricted set of uplink signals. For the tradeoff between power saving and network performance, the terminal restrict CSI transmission and SRS transmission. The terminal still performs P-CGI transmission and HARQ feedback transmission.

- AP-CSI on PUSCH.
- Aperiodic SRS (AP-SRS).
- HARQ feedback on PUCCH.
- HARQ feedback on PUSCH.

PUSCH transmission based on configured grant.

P-CGI on PUCCH.

P-CGI on PUSCH.

Restricted_Transmission_Period_2

During this period, the terminal performs uplink transmission for restricted set of uplink signals. To achieve more power saving, the terminal completely stop CSI transmission and SRS transmission. The terminal performs uplink transmissions for the following signal.

PUSCH transmission based on configured grant (depending on RRC configuration).

P-CGI on PUCCH.

P-CGI on PUSCH (depending on RRC configuration)

Restricted_Transmission_Period_3

During this period, the terminal performs uplink transmission for restricted set of uplink signals. Comparing to Restricted_Transmission_Period_2, PUSCH transmission for configured grant is allowed in Restricted_Transmission_Period_3.

PUSCH transmission based on configured grant.

P-CGI on PUCCH.

P-CGI on PUSCH (depending on RRC configuration).

Static_Transmission_Period and Restricted_Transmission_Period_2 and Restricted_Transmission_Period_3 occur periodically (with possibly different periodicity).

Dynamic_Transmission_Period occurs dynamically. More specifically, Dynamic_Transmission_Period occurs after a Static_Transmission_Period if a certain event occurs during the Static_Transmission_Period.

Restricted_Transmission_Period_1 occurs irregularly. Time period that is neither Static_Transmission_Period nor Dynamic_Transmission_Period nor Restricted_Transmission_Period_2 nor Restricted_Transmission_Period_3 is Restricted_Transmission_Period_1.

Maximum power saving is achieved during Restricted_Transmission_Period_2. Most power is consumed during Static_Transmission_Period.

By configuring Static_Transmission_Period and Dynamic_Transmission_Period and Restricted_Transmission_Period_2 and Restricted_Transmission_Period_3 appropriately, network can maximize the power saving with sustainable QoS for XR traffic.

Figure 2A:
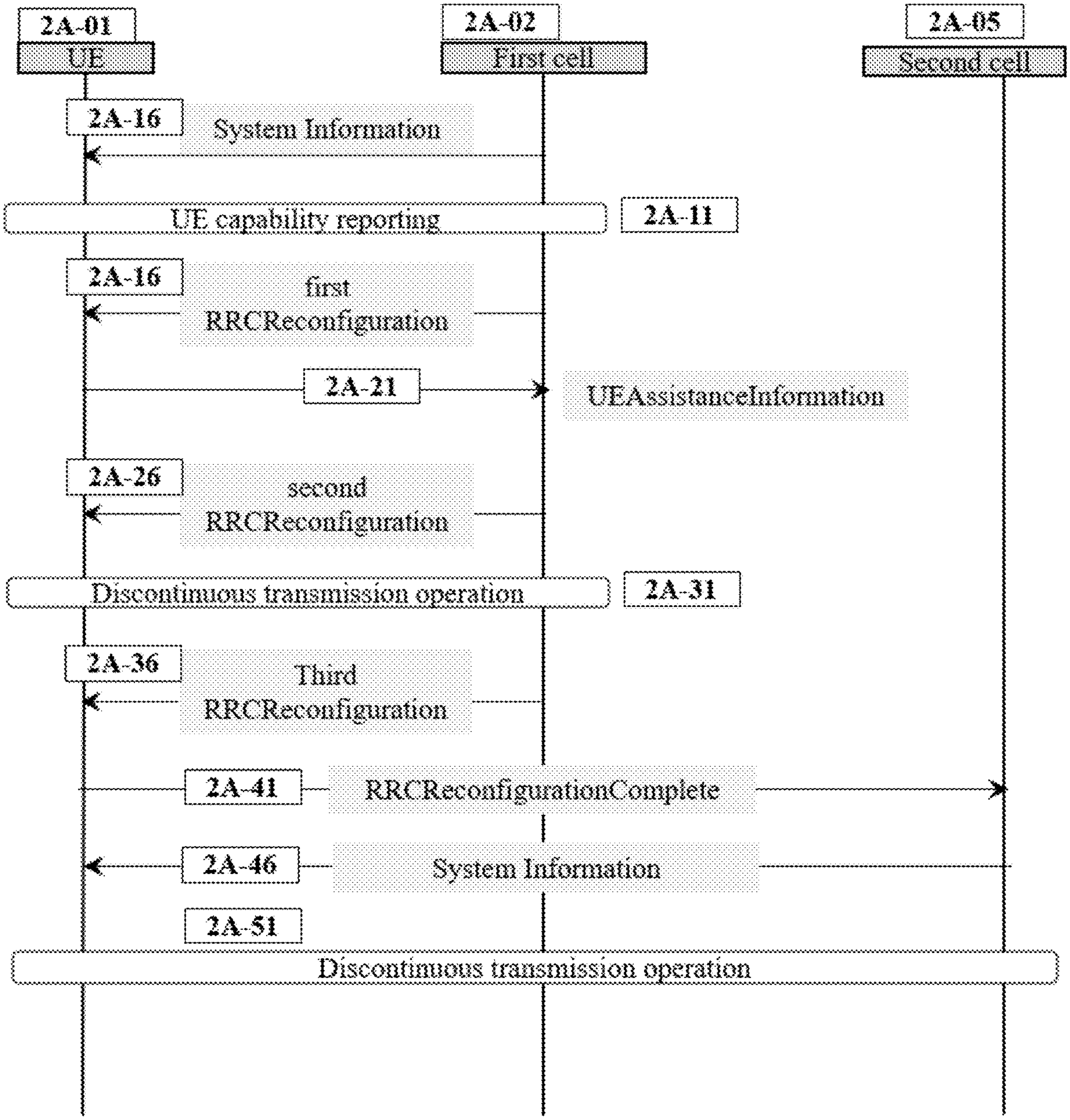
FIG. 2A is a diagram illustrating operations of the terminal and a base station according to an embodiment of the present invention.

FIG. 2A illustrates the operations of the terminal and base station according to the embodiments of the invention.

In 2A-06, the terminal receives a system information in a first cell from a base station. The system information includes following fields.

frame_number: This field indicates an integer between 0 and 1023. It increments by one every radio frame.

The terminal initializes the first counter with the received frame number.

In 2A-11, the terminal transmits a UECapabilityInformation to the base station.

The UECapabilityInformation includes following fields.

a first capability information indicates whether the terminal supports reporting of one or more uplink traffic patterns for a radio bearer.

a second capability information indicates whether the terminal supports Static_Transmission_Period_Determination_mode_2. If the terminal supports Static_Transmission_Period_Determination_mode_2, the terminal shall also support non-integer value periodicity for DTX operation.

a third capability information indicates whether the terminal supports Restricted_Transmission_Period_2.

a fourth capability information indicates whether the terminal supports Restricted_Transmission_Period_3.

The base station determines configurations for the terminal based on the capability information.

In 2A-16, the terminal receives a RRCReconfiguration from the base station.

The RRCReconfiguration can include one or more radio bearer configurations. Each radio bearer configuration includes following fields.

radio bearer identifier.

PDCP configuration.

indicator for PDCP reestablishment.

indicator for PDCP recovery.

PDU session identifier.

one or more QoS flow Identifiers.

The terminal establishes PDCP entities and radio bearers based on the radio bearer configurations.

The RRCReconfiguration can include MAC configuration information which includes following fields.

BSR configuration.

The terminal configures BSR based on the BSR configuration.

The RRCReconfiguration can include CSI configuration information and SRS configuration information.

Channel State Information (CSI) is information on channel state estimated over certain reference signals. CSI is transmitted either on PUCCH or on PUSCH. CSI is transmitted either periodically or semi-persistently or aperiodically.

CSI configuration information includes following information.

CSI format information that indicates the number of bits for CSI and the type of CSI information to be reported.

CSI type information that indicates whether the CSI is periodic CSI or semi-persistent CSI or aperiodic CSI.

Time pattern information for periodic CSI and semi-persistent CSI. This information indicates the periodicity and offset of subframe where CSI is transmitted.

Time pattern information for aperiodic CSI. This information indicates time distance between DCI reception and CSI reporting.

PUCCH resource information for periodic CSI. This information indicates the identifier of PUCCH resource to be used for periodic CSI reporting.

PUCCH resource information for semi-persistent CSI. This information indicates the identifier of PUCCH resource to be used for semi-persistent CSI reporting.

Periodic CSI (P-CSI) is transmitted in PUCCH. Terminal starts P-CSI transmission when P-CSI is configured by a RRCReconfiguration. Terminal stops P-CSI transmission when P-CSI is released by a RRCReconfiguration.

Semi-Persistent CSI (SP-CSI) is transmitted either in PUCCH or PUSCH. Terminal starts SP-CSI on PUCCH when a MAC CE activating SP-CSI is received. Terminal stops SP-CSI on PUCCH when a MAC CE deactivating SP-CSI is received. Terminal starts SP-CSI on PUSCH when a DCI activating SP-CSI on PUSCH is received. Terminal stops SP-CSI on PUSCH when a DCI deactivating SP-CSI on PUSCH is received.

Aperiodic CSI (AP-CSI) is transmitted in PUSCH. Terminal transmits AP-CSI one time when a DCI activating AP-CSI is received.

Sounding Reference Signal (SRS) is transmitted by terminal for the base station to estimate the channel quality.

SRS is transmitted on PUSCH. SRS is transmitted either periodically or semi-persistently or aperiodically.

SRS configuration information includes following information.

SRS type information that indicates whether the SRS is periodic SRS (P-SRS) or semi-persistent SRS (SP-SRS) or aperiodic SRS (AP-SRS).

Time pattern information for periodic SRS and semi-persistent SRS. This information indicates the periodicity and offset of subframe where SRS is transmitted. This information also indicates which symbols of the subframe is used for SRS transmission.

Time pattern information for aperiodic SRS. This information indicates time distance between DCI reception and SRS reporting.

PUSCH resource information for periodic SRS. This information indicates resource blocks for SRS transmission.

The RRCReconfiguration can include UEAssistanceInformation configuration information which includes following fields.

uplink_traffic_pattern_reporting_indication.

List of radio bearer identifiers: List of radio bearers for which uplink traffic pattern reporting is allowed.

If the base station is capable of configuring DTX based on uplink traffic pattern and the terminal reported that it can report uplink traffic pattern, the base station includes Indication_uplink_traffic_pattern_reporting.

The terminal considers uplink traffic pattern reporting for XR traffic is allowed based on that uplink_traffic_pattern_reporting_indication is present.

In 2A-21, the terminal transmits a UEAssistanceInformation to the base station.

UE determines the traffic pattern information for a radio bearer if the radio bearer is configured for XR traffic (e.g. QoS flows for NR are served by the radio bearer).

When uplink traffic is generated for the radio bearers indicated by the list of radio bearer identifiers, the terminal determines the traffic pattern. The terminal creates uplink traffic pattern information. If one pattern is not enough, more than one patterns can be created.

PDU_arrival_offset: this field indicates the estimated timing for a specific PDU set arrival in the uplink of the corresponding bearer.

PDU_arrival_periodicity: this field indicates the estimated PDU set arrival periodicity in the uplink of the corresponding bearer.

Each pattern corresponds to a specific time pattern indicated by the corresponding PDU_arrival_offset and the corresponding PDU_arrival_periodicity.

The base station determines DTX configurations based on the uplink traffic patterns reported by the terminal and the downlink traffic patterns observed by the base station itself.

The base station determines uplink configured grant configurations based on the uplink traffic patterns reported by the terminal.

In 2A-26, the base station transmits a second RRCReconfiguration to the terminal.

The second RRCReconfiguration includes DTX configurations and configured grant configurations.

If the RRCReconfiguration includes DTX configurations, the terminal and the base station performs DTX operation. If DTX is configured for the terminal, the terminal transmits specific set of uplink signals during various transmission periods.

Serving Cells of the terminal may be configured by RRC in two DTX groups with separate DTX parameters. When RRC does not configure a secondary DTX group, there is only one DTX group and all Serving Cells belong to that one DTX group. When two DTX groups are configured, each Serving Cell is uniquely assigned to either of the two groups. The DTX parameters that are separately configured for each DTX group are Static_Transmission_Timer and Dynamic_Transmission_Timer and DTX_Cycle_Offset2. The DTX parameters that are common to the DTX groups are DTX-SlotOffset and DTX_Cycle_Offset and Static_Transmission_Period_Determination_2 and BigFrameNumber and ReferenceFrameNumber2.

Various DTX configurations can be included in a MAC-CellGroupConfig in a RRCReconfiugration.

A MAC-CellGroupConfig can includes DTX configurations as shown below.

```
  MAC-CellGroupConfig ::=   SEQUENCE {
     DTX-Config   SetupRelease { DTX-Config } OPTIONAL,       -- Need
M
     DTX-ConfigSecondary SetupRelease { DTX-ConfigSecondary }
OPTIONAL -- Need M
     ]],
        DTX2-Config SetupRelease { DTX2-Config } OPTIONAL, -- Need M
        DTX2-ConfigSecondary   SetupRelease { DTX2-Config } OPTIONAL,
-- Need M
        DTX3-Config DTX3-Config OPTIONAL, -- Need R
        DTX3-ConfigSecondaryGroup   DTX3-Config OPTIONAL, -- Need
R
        DTX4-Config SetupRelease { DTX4-Config } OPTIONAL, -- Need M
        DTX5-Config SetupRelease { DTX5-Config } OPTIONAL, -- Need M
  ...
```

The terminal generates UEAssistanceInformation for uplink traffic pattern reporting.

The UEAssistanceInformation includes following fields.

Uplink_Traffic_Pattern_Information.

radio_bearer_Identifier: This field indicates the radio bearer where the uplink traffic is served.

one or multiple pattern_Info. Each pattern_info comprises following fields.

DTX-Config includes DTX configuration for the primary DTX group. This Information Element (IE) includes fields shown below.

```
DTX-Config ::=                        SEQUENCE {
       Static__Transmission__Timer   CHOICE {
       subMilliSeconds INTEGER (1..31),
       milliSeconds   ENUMERATED {ms1, ms2,... }
                                              },
```

-continued

```
    Dynamic__Transmission__Timer          ENUMERATED {ms0,
ms1, ms2, ... },
    DTX__Cycle__Offset                   CHOICE {
        ms10                              INTEGER(0..9),
        ms20                              INTEGER(0..19),
        ms32                              INTEGER(0..31),
        ms40                              INTEGER(0..39),
        ms60                              INTEGER(0..59),
        ms64                              INTEGER(0..63),
        ms70                              INTEGER(0..69),
        ms80                              INTEGER(0..79),
        ms128                             INTEGER(0..127),
        ms160                             INTEGER(0..159),
        ms256                             INTEGER(0..255),
        ms320                             INTEGER(0..319),
        ms512                             INTEGER(0..511),
        ms640                             INTEGER(0..639),
        ms1024                            INTEGER(0..1023),
        ms1280                            INTEGER(0..1279),
        ms2048                            INTEGER(0..2047),
        ms2560                            INTEGER(0..2559),
        ms5120                            INTEGER(0..5119),
        ms10240                           INTEGER(0..10239)
    },
    ...
```

Dynamic_Transmission_Timer field indicates a value in multiple integers of 1 ms. ms0 corresponds to 0, ms1 corresponds to 1 ms, ms2 corresponds to 2 ms, and so on. The terminal starts or restarts the timer when PDCCH indicating new transmission is received. This field indicates the length of Dynamic_Transmission_Timer for the primary DTX group. This field indicates the length of Dynamic_Transmission_Period of the primary DTX group.

DTX_Cycle_Offset field is defined as a CHOICE structure. The CHOICE structure is defined with 20 integer sets. Each integer set has different value range (ranges from zero to a specific maximum value). This field includes an integer and an information indicating from which integer set the integer is chosen. The integer is DTXStartOffset. Sum of the maximum value of the integer set and one is equal to DTXCycle. DTX_Cycle_Offset field indicates a DTXCycle and DTXStartOffset that are commonly applied to the primary DTX group and the secondary DTX group.

Static_Transmission_Timer field indicates a value in multiples of 1/32 ms (subMilliSeconds) or in ms (milliSecond). This field indicates the length of Static_Transmission_Timer/Static_Transmission_Period of the primary DTX group. This field indicates the length of Static_Transmission_Period of the primary DTX group.

DTX-ConfigSecondary includes configuration information for the secondary DTX group. This IE includes following fields.

```
    Static__Transmission__Timer field indicates Static__Transmission__Timer value for
secondary DTX group.
    Dynamic__Transmission__Timer field indicates Dynamic__Transmission__Timer
value for secondary DTX group.
    DTX2-Config IE in DTX2-Config field
    DTX2-Config IE in DTX2-Config field includes an information on additional
periodicity and additional offset for the primary DTX group.
    DTX2-Config ::=                      SEQUENCE {
        DTX__Cycle__Offset2                  CHOICE {
      ms16.7                             INTEGER(0..16),
      ms33.4                             INTEGER(0..33),
      ms50.1                             INTEGER(0..50),
        },
    ...
    }
```

This IE includes DTX_Cycle_Offset2 field. The DTX_Cycle_Offset2 field in DTX2-Config field replaces DTX_Cycle_Offset field in DTX-Config field for the primary DTX group. The DTX_Cycle_Offset2 field in DTX2-Config field does not replace DTX_Cycle_Offset field in DTX-Config field for the secondary DTX group.

DTX_Cycle_Offset2 field is defined as another CHOICE structure with another plurality of integer sets. The base station includes in this field an integer and an information indicating from which integer set the integer is chosen. Each integer set is mapped with a specific non-integer value. The maximum value of the integer set is equal to the closest lower integer to the mapped non-integer value. The mapped non-integer value of the integer set from which the integer is chosen is DTXCycle. The integer itself is DTXStartOffset. DTX_Cycle_Offset2 field of DTX2-Config field indicates a DTXCycle and DTXStartOffset that are applied to the primary DTX group.

DTX2-Config IE in DTX2-ConfigSecondary field includes an information on additional periodicity and additional offset for the secondary DTX group.

The DTX_Cycle_Offset2 field in DTX2-ConfigSecondary field replaces DTX_Cycle_Offset field in DTX-Config field for the secondary DTX group. The DTX_Cycle_Offset2 field in DTX2-ConfigSecondary field does not replace DTX_Cycle_Offset field in DTX-Config field for the primary DTX group.

DTX_Cycle_Offset2 field in DTX2-ConfigSecondary field includes an integer and an information indicating from which integer set the integer is chosen from. DTX_Cycle_Offset2 field of DTX2-ConfigSecondary field indicates a DTXCycle and DTXStartOffset that are applied to the secondary DTX group.

Depending on presence/absence of DTX_Cycle_Offset2 field, DTXCycle and DTXStartOffset for each DTX group are determined as followings.

If DTX_Cycle_Offset2 field is indicated for the primary DTX group (if DTX2-Config field is set to 'setup') and if DTX_Cycle_Offset2 field is indicated for the secondary DTX group (if DTX2-ConfigSecondary field is set to 'setup'),
- DTXCycle/DTXStartOffset for the primary DTX group are determined based on DTX_Cycle_Offset2 field in DTX2-Config field; and
- DTXCycle/DTXStartOffset for the secondary DTX group are determined based on DTX_Cycle_Offset2 field in DTX2-ConfigSecondary field.

If DTX_Cycle_Offset2 field is indicated for the primary DTX group (if DTX2-Config field is set to 'setup') and if DTX_Cycle_Offset2 field is not indicated for the secondary DTX group (if DTX2-ConfigSecondary field is set to 'release'), DTXCycle/DTXStartOffset for the primary DTX group are determined based on DTX_Cycle_Offset2 field in DTX2-Config field; and DTXCycle/DTXStartOffset for the secondary DTX group are determined based on DTX_Cycle_Offset2 field in DTX2-Config field.

If DTX_Cycle_Offset2 field is not indicated for the primary DTX group (if DTX2-Config field is set to 'release') and if DTX_Cycle_Offset2 field is indicated for the secondary DTX group (if DTX2-ConfigSecondary field is set to 'setup'), DTXCycle/DTXStartOffset for the primary DTX group are determined based on DTX_Cycle_Offset field in DTX-Config field.

DTXCycle/DTXStartOffset for the secondary DTX group are determined based on DTX_Cycle_Offset2 field in DTX2-ConfigSecondary field; and If DTX_Cycle_Offset2 field is not indicated for the primary DTX group (if DTX2-Config field is set to 'release') and if DTX_Cycle_Offset2 field is not indicated for the secondary DTX group (if DTX2-ConfigSecondary field is set to 'release'), DTXCycle/DTXStartOffset for the primary DTX group are determined based on DTX_Cycle_Offset field in DTX-Config field.

DTXCycle/DTXStartOffset for the secondary DTX group are determined based on DTX_Cycle_Offset field in DTX-Config field.

DTX3-Config IE for primary DTX group is included in DTX3-Config field.

DTX3-Config IE in DTX3-Config field provides additional DTX parameters for the primary DTX group.

If Static_Transmission_Period_Determination_2 field is present and BigFrameNumber is present, the terminal initializes the second_counter to the value indicated in BigFrameNumber field.

ReferenceFrameNumber1 field is an optional field. This field is absent if Static_Transmission_Period_Determination_2 field is absent. To determines the starting subframe of Static_Transmission_Timer, the terminal uses the closest SFN as the DTX-timeReferenceSFN preceding the reception of the DTX3-Config.

If Static_Transmission_Period_Determination_2 field is present and ReferenceFrameNumber1 field is absent, the terminal uses SFN 0 as DTX-timeReferenceSFN.

If Static_Transmission_Period_Determination_2 field is present and ReferenceFrameNumber1 field is present, the terminal uses SFN 512 as DTX-timeReferenceSFN.

ReferenceFrameNumber2 field is an optional field. This field is absent if Static_Transmission_Period_Determination_2 field is absent. With regards to determination of the starting subframe for Static_Transmission_Timer, the terminal updates the second_counter based on a first SFN and the value indicated in ReferenceFrameNumber1 field. The first SFN is the SFN when DTX3-Config is received.

If Static_Transmission_Period_Determination_2 field is present and ReferenceFrameNumber2 field is absent, the terminal does not update the second_counter.

If Static_Transmission_Period_Determination_2 field is present and ReferenceFrameNumber2 field is present, the terminal updates the second_counter.

Static_Transmission_Period_Determination_2 field being present is equivalent to starting subframe of Static_Transmission_Timer being determined based on Static_Transmission_Period_Determination_mode_2.

Static_Transmission_Period_Determination_2 field being absent is equivalent to starting subframe of Static_Transmission_Timer being determined based on Static_Transmission_Period_Determination_mode_1.

```
DTX3-Config ::=            SEQUENCE {
    Static__Transmission__Period__Determination__2            ENUMERATED
{true} OPTIONAL, -- Need R
    BigFrameNumber INTEGER(0..1023)                          OPTIONAL, -- Need
R
    ReferenceFrameNumber1 ENUMERATED {512}                    OPTIONAL, -
- Need R
    ReferenceFrameNumber2 INTEGER(0..1023)                    OPTIONAL, -
- Need R
  ...
  }
```

DTX3-Config IE is to provide the configuration information related to Static_Transmission_Period_Determination_mode_2.

Static_Transmission_Period_Determination_2 field is an optional field.

If this field is present, the terminal determines the starting subframe of Static_Transmission_Timer based on Static_Transmission_Period_Determination_mode_2.

If this field is absent, the terminal determines the starting subframe of Static_Transmission_Timer based on Static_Transmission_Period_Determination_mode_1.

BigFrameNumber is an optional field. This field is related to second_counter. This field is absent if Static_Transmission_Period_Determination_2 field is absent.

If Static_Transmission_Period_Determination_2 field is present and BigFrameNumber is absent, the terminal initializes the second_counter to zero. Alternatively, the terminal initializes the second_counter to one.

DTX3-Config IE for secondary DTX group is included in DTX3-ConfigSecondaryGroup field.

Depending on presence/absence of Static_Transmission_Period_Determination_2 field, the terminal determines how to determine the starting subframe of Static_Transmission_Timer for each DTX group.

In a first embodiment, the starting subframe of Static_Transmission_Timer for primary DTX group and the starting subframe of Static_Transmission_Timer for secondary DTX group are determined based on separate IEs.

If Static_Transmission_Period_Determination_2 field is absent in DTX3-Config IE and Static_Transmission_Period_Determination_2 field is present in DTX3-ConfigSecondaryGroup IE, The terminal determines to use Static_Transmission_Period_Determination_mode_1 for the primary DTX group and Static_Transmission_Period_Determination_mode_2 for the secondary DTX group.

If Static_Transmission_Period_Determination_2 field is present in DTX3-Config IE and Static_Transmission_Period_Determination_2 field is absent in DTX3-ConfigSecondaryGroup IE, The terminal determines to use Static_Transmission_Period_Determination_mode_2 for the primary DTX group and Static_Transmission_Period_Determination_mode_1 for the secondary DTX group.

In a second embodiment, the starting subframe of Static_Transmission_Timer for primary DTX group and the starting subframe of Static_Transmission_Timer for secondary DTX group are determined based on a single IE (Static_Transmission_Period_Determination_2 in DTX3-Config IE).

If Static_Transmission_Period_Determination_2 field is absent in DTX3-Config IE, the terminal determines to use Static_Transmission_Period_Determination_mode_1 for the primary DTX group and Static_Transmission_Period_Determination_mode_1 for the secondary DTX group.

If Static_Transmission_Period_Determination_2 field is present in DTX3-Config IE, the terminal determines to use Static_Transmission_Period_Determination_mode_2 for the primary DTX group and Static_Transmission_Period_Determination_mode_2 for the secondary DTX group.

In a third embodiment, the starting subframe of Static_Transmission_Timer for primary DTX group and the starting subframe of Static_Transmission_Timer for secondary DTX group are determined based on a single IE or separate IEs.

If Static_Transmission_Period_Determination_2 field is absent in DTX3-Config IE, The terminal determines to use Static_Transmission_Period_Determination_mode_1 for the primary DTX group.

If Static_Transmission_Period_Determination_2 field is present in DTX3-Config IE, The terminal determines to use Static_Transmission_Period_Determination_mode_2 for the primary DTX group.

If Static_Transmission_Period_Determination_2 field is absent in DTX3-Config IE and Static_Transmission_Period_Determination_2 field is absent in DTX3-ConfigSecondaryGroup IE, The terminal determines to use Static_Transmission_Period_Determination_mode_1 for the secondary DTX group.

If Static_Transmission_Period_Determination_2 field is absent in DTX3-Config IE and Static_Transmission_Period_Determination_2 field is present in DTX3-ConfigSecondaryGroup IE, The terminal determines to use Static_Transmission_Period_Determination_mode_2 for the secondary DTX group.

If Static_Transmission_Period_Determination_2 field is present in DTX3-Config IE and Static_Transmission_Period_Determination_2 field is absent in DTX3-ConfigSecondaryGroup IE, The terminal determines to use Static_Transmission_Period_Determination_mode_2 for the secondary DTX group.

To save signaling overhead, parameters for Static_Transmission_Period_Determination_mode_2 can be shared between primary DTX group and secondary DTX group.

BigFrameNumber field is provided either in a DTX3-Config or in DTX3-ConfigSecondaryGroup.

If BigFrameNumber field is present in a DTX3-Config and if Static_Transmission_Period_Determination_mode_2 is configured both to the primary DTX group and to the secondary DTX group, The terminal applies the value indicated in BigFrameNumber field both to the primary DTX group and the secondary DTX group.

If BigFrameNumber field is present in a DTX3-Config-Secondary and if Static_Transmission_Period_Determination_mode_2 is configured only to the secondary DTX group, The terminal applies the value indicated in the BigFrameNumber field to the secondary DTX group.

If BigFrameNumber field is present neither in a DTX3-Config nor in DTX3-ConfigSecondary and if Static_Transmission_Period_Determination_mode_2 is configured both to the primary DTX group and the secondary DTX group, The terminal applies zero both to the primary DTX group and to the secondary DTX group.

That the starting subframe of Static_Transmission_Timer is determined based on Static_Transmission_Period_Determination_mode_1 means that the starting subframe of Static_Transmission_Timer is determined based on DTX_Cycle_Offset field in DTX-Config and first_counter and subframe number.

That the starting subframe of Static_Transmission_Timer is determined based on Static_Transmission_Period_Determination_mode_2 means that the starting subframe of Static_Transmission_Timer is determined based on DTX_Cycle_Offset2 field in DTX2-Config (or in DTX2-ConfigSecondary) and second_counter and first_counter and subframe number.

In another embodiment, that the starting subframe of Static_Transmission_Timer is determined based on Static_Transmission_Period_Determination_mode_2 means that the starting subframe of Static_Transmission_Timer is determined based on DTX_Cycle_Offset2 field in DTX2-Config (or in DTX2-ConfigSecondary) and ReferenceFrameNumber2 in DTX3-Config (or in DTX3-ConfigSecondaryGroup).

---

DTX4-Config IE in dtx4-Config field provides DTX parameters related to Restricted_Transmission_Period_2.

```
DTX4-Config ::=  SEQUENCE {
  Length ENUMERATED {ms1, ms3, ms4,... },
DTX_Cycle_Offset              CHOICE {
ms10                        INTEGER(0..9),
ms20                        INTEGER(0..19),
        ...,
  Allowed_Configured_Grant_List     SEQUENCE (SIZE (1..n)) OF
Configured_Grant_Index           OPTIONAL, -- Need R
```

-continued

```
      Allowed_DRB_List              SEQUENCE (SIZE (1..m)) OF drb-Identifier
      OPTIONAL, -- Need R
      CGI_PUCCH_Allowed               Enumerated {allowed}
  OPTIONAL...
```

Length field indicates the length of Restricted_Transmission_Period_2 in ms (or in number of subframes).

Allowed_Configured_Grant_List field comprises one or more configured_grant_configuration_index. This field indicates which configured grants are allowed to be transmitted in Restricted_Transmission_Period_2. Terminal performs uplink transmission for the configured grants indicated in Allowed_Configured_Grant_List during Restricted_Transmission_Period_2.

Allowed_DRB_List field comprises one or more DRB identifiers. This field indicates PDU sets from which DRBs are allowed to be transmitted in Restricted_Transmission_Period_2. Terminal performs uplink transmission for the configured grant associated with the DRBs indicated in Allowed_DRB_List during Restricted_Transmission_Period_2. This field can further indicates QoS flows that can be transmitted during Restricted_Transmission_Period_2.

If neither Allowed_Configured_Grant_List nor Allowed_DRB_List field are present in DTX4-Config, terminal consider uplink transmission for configured grant is not allowed during Restricted_Transmission_Period_2. In this case, the terminal does not perform PUSCH transmission for configured grant during Restricted_Transmission_Period_2.

CGI_PUCCH_Allowed indicates whether CGI on PUCCH is allowed for transmission during Restricted_Transmission_Period_2. If this field is present in DTX4-Config, the terminal performs CGI transmission on PUCCH during Restricted_Transmission_Period_2.

CGI transmission on PUSCH is allowed during Restricted_Transmission_Period_2. The terminal performs CGI transmission on PUSCH during Restricted_Transmission_Period_2.

```
  DTX5-Config IE in dtx5-Config field provides DTX parameters
related to Restricted_Transmission_Period_3.
  DTX5-Config ::=  SEQUENCE {
         Length ENUMERATED {ms1, ms3, ms4, },
     DTX_Cycle_Offset                   CHOICE {
       ms10                            INTEGER(0..9),
       ms20                            INTEGER(0..19),
             ...,
         CGI_PUSCH_Allowed              Enumerated {allowed}
  OPTIONAL
```

CGI_PUSCH_Allowed indicates whether CGI on PUSCH is allowed during Restricted_Transmission_Period_2. If this field is present in DTX5-Config, the terminal performs CGI transmission on PUSCH during Restricted_Transmission_Period_3.

CGI transmission on PUCCH is allowed during Restricted_Transmission_Period_3. The terminal performs CGI transmission on PUCCH during Restricted_Transmission_Period_3.

PUSCH transmission during Restricted_Transmission_Period_3 is allowed. Terminal performs uplink transmission for configured uplink grants during Restricted_Transmission_Period_3.

The RRCReconfiguration can include one or more configured grant configurations for each UL BWP.

```
  RRCReconfiguration
     uplinkBWP-config       SEQUENCE {
          configuredGrantConfigToAddMod SEQUENCE (SIZE (1..x)) OF
ConfiguredGrantConfig    OPTIONAL,
   ...
```

A ConfiguredGrantConfig comprises a configured_qjgrant_base_configurations and one or more configured_grant_additional_configurations.

The configured_grantbase_configuration indicates the frequency domain resource and time domain resource and other transmission parameters.

The configured_grant_additional_configuration indicates time domain resource. A set of configured grants are configured based on a configured_grant_base_configuration and a configured_grant_additional_configuration. A configured_grant_base_configuration in a ConfiguredGrantConfig is common to one or more configured_grant_additional_configurations included in the corresponding ConfiguredGrantConfig.

- configured_grantbase_configuration includes following fields.
  - Allowed_DRB_List: This field indicates data from which DRBs are allowed to be transmitted on PUSCH scheduled by the configured grants configured by the ConfiguredGrantConfig. This field can further indicates QoS flows for the configured grants configured by the ConfiguredGrantConfig.
  - HARQ_PID_Determination_2: This field indicates whether the terminal applies HARQ_PID_Determinal_2 in determining HARQ process ID. If this field is absent, the terminal applies HARQ_PID_Determinal_1.
  - MCS_table_information. This field indicates which MCS table is used for the configured grant.
  - DMRS_configuration. This field indicates DMRS configuration of the configured grant . . . .
  - configured_grant_configuration_index. This field indicates the index of the configured grant configuration.
  - number_of_HARQ_Processes: This field indicates the number of HARQ processes for this configured grant.
  - HARQ_Process_ID_offset. This field configures the range of HARQ process ID which can be used for this configured grant. Terminal selects a HARQ ID within [HARQ_Process_ID_offset, . . . , (HARQ_Process_ID_offset+number_of_HARQ_Processes−1)]
  - Frequency_Domain_Resource_Information. This field is a bit map and indicates which frequency domain resource is allocated to the configured grant.
  - Time_Domain_Resource_Information. This field indicates time pattern of the configured grant.
    - Periodicity_configured_grant: This field indicates periodicity of the configured grant in the number of symbols of the uplink bandwidth part.
    - time_domain_offset: This field indicates time domain offset of the configured grant in the number of slots of the uplink bandwidth part.

time_domain_allocation: This field indicates a combination of start symbol and length and PUSCH mapping type.

Each of one or more configured_grant_additional_configuration includes following fields.

configured_grant_configuration_index_2.

HARQ_Process_ID_offset.

Time_Domain_Resource_Information_part_1

Periodicity_configured_grant.

time_domain_offset configured_grant_base_configuration_index. This field indicates the configured grant base configuration to which this configured grant refers to.

For configured grant associated with a configured_grant_base_configuration, the terminal determines the configuration of the configured grant based on the configured_grant_base_configuration.

For configured grant associated with a configured_grant_additional_configuration, the terminal determines the configuration of the configured grant based on the configured_grant_additional_configuration and a configured_grantbase_configuration. The configured_grantbase_configuration is indicated by the configured_grant_base_configuration_index in the configured_grant_additional_configuration.

A field_set_1 is indicated in a configured_grant_additional_configuration and applied only to the configured grants of the configured_grant_additional_configuration. The field_set_1 includes HARQ_Process_ID_offset and Periodicity_configured_grant and time_domain_offset.

A field_set_2 is indicated in a configured_grant_additioal_configuration and applied to configured grants of a one or more configured_grant_base_configuration. The field_set_2 includes MCS_table_information and DMRS_configuration and number_of_HARQ_Processes and Frequency_Domain_Resource_Information and time_domain_allocation and Second_Frame_Number_Indicator.

The RRCReconfiguration can include one or more CGI configurations. Each of the one or more CGI configuration is per UL BWP (specific to an UL BWP).

Terminal transmits CGI at a specific point of time on a specific radio resource with a specific format based on CGI configuration of the currently active uplink bandwidth part.

Each of CGI configuration comprises following fields.

```
CGI_Config ::=   SEQUENCE {
   cgi_Resource CHOICE {
      cgi_PUCCH              PUCCH_Resource_Id,
      cgi_PUSCH              PUSCH_Resource_Id
                             },
associated_ServingCellIndexServingCellIndex
   associated_CGIndex   SEQUENCE (SIZE (1..k)) OF
configured_grant_configuration_index,
   time_Pattern_Info      Time_Pattern_CGI
```

Configured Grant Indication (CGI) is transmitted in frequency domain indicated by cgi_Resource field.

If the cgi_Resource_field includes PUCCH_Resource_Id, CGI transmission is performed in PUCCH indicated by PUCCH_Resrouce_Id.

If the cgi_Resource_field includes PUSCH_Resource_Id, CGI transmission is performed in PUSCH indicated by PUSCH_Resrouce_Id.

associated_ServingCellIndex field indicates the serving cell for which the configured grants are configured Associated CGIndex field indicates configured grants reported in the CGI. The first configured_grant_configuration_index corresponds to the first bit of the CGI, the second configured_grant_configuration_index corresponds to the second bit of the CGI and so on.

Time_Pattern_CGI IE comprises an first parameter and a second parameter. The first parameter indicates a first CGI slot. The second parameter indicates the periodicity of the CGI slots.

Terminal transmits CGI in the PUCCH/PUSCH resource which is indicated by PUCCH/PUSCH resource id and is closest to the CGI slot.

In 2A-31, the terminal and the base station performs DTX operation and configured grant transmission based on the configuration information indicated in the RRCReconfiguration.

determining on_duration_starting_point_determination_mode and HARQ_PID_determination The terminal determines whether to use Static_Transmission_Period_Determination_mode_1 or Static_Transmission_Period_Determination_mode_2 for the primary DTX group and the secondary DTX group.

In a first embodiment, the terminal performs determination based on presence/absence of Static_Transmission_Period_Determination_2 field.

If Static_Transmission_Period_Determination_2 field is not indicated for the primary DTX group (if Static_Transmission_Period_Determination_2 field is absent in DTX3-Config), the terminal applies Static_Transmission_Period_Determination_mode_1 for the primary DTX group.

If Static_Transmission_Period_Determination_2 field is indicated for the primary DTX group (if Static_Transmission_Period_Determination_2 field is present in DTX3-Config), the terminal applies Static_Transmission_Period_Determination_mode_2 for the primary DTX group.

If Static_Transmission_Period_Determination_2 field is not indicated for the secondary DTX group (if Static_Transmission_Period_Determination_2 field is absent in DTX3-ConfigSecondaryGroup), the terminal applies Static_Transmission_Period_Determination_mode_1 for the secondary DTX group.

If Static_Transmission_Period_Determination_2 field is indicated for the secondary DTX group (if Static_Transmission_Period_Determination_2 field is present in DTX3-ConfigSecondaryGroup), the terminal applies Static_Transmission_Period_Determination_mode_2 for the secondary DTX group.

In a second embodiment, to reduce the signaling overhead, the terminal performs determination based on configured periodicity.

If an integer value is configured for long DTX cycle of the primary DTX group (DTX_Cycle_Offset2 field is absent in DTX2-Config IE; or DTX2-Config IE is absent in MAC-CellGroupConfig IE), the terminal applies Static_Transmission_Period_Determination_mode_1 for the primary DTX group.

If a non-integer value is configured for long DTX cycle of the primary DTX group (DTX_Cycle_Offset2 field is present in DTX2-Config IE), the terminal applies Static_Transmission_Period_Determination_mode_2 for the primary DTX group.

If an integer value is configured for long DTX cycle of the secondary DTX group (DTX_Cycle_Offset2 field is absent in DTX2-ConfigSecondary IE; or DTX2-ConfigSecondary IE is absent in MAC-CellGroupConfig IE), the terminal applies Static_Transmission_Period_Determination_mode_1 for the secondary DTX group.

If a non-integer value is configured for long DTX cycle of the secondary DTX group (DTX_Cycle_Offset2 field is present in DTX2-ConfigSecondary IE), the terminal applies Static_Transmission_Period_Determination_mode_2 for the secondary DTX group.

In a third embodiment, to achieve the signaling overhead reduction and to overcome the limitation of the second embodiment, the terminal performs determination based on the periodicity and the presence/absence of Static_Transmission_Period_Determination_2 field. The limitation of the second embodiment is that if an integer value of non divisor of 10240 is configured for DTX cycle, different outcome is produced for Static_Transmission_Period_Determination_mode_1 and Static_Transmission_Period_Determination_mode_2 after SFN wraparound.

If a first integer value is configured for long DTX cycle of the primary DTX group (DTX_Cycle_Offset2 field is absent in DTX2-Config IE and DTX_Cycle_Offset field in DTX-Config indicates a first integer value for DTX_Cycle), The terminal applies Static_Transmission_Period_Determination_mode_1 for the primary DTX group.

If a second integer value is configured for long DTX cycle of the primary DTX group (DTX_Cycle_Offset2 field is absent in DTX2-Config IE and DTX_Cycle_Offset field in DTX-Config indicates a second integer value for DTX_Cycle) and If Static_Transmission_Period_Determination_2 field is not configured for the primary DTX group, The terminal applies Static_Transmission_Period_Determination_mode_1 for the primary DTX group.

If a second integer value is configured for long DTX cycle of the primary DTX group (DTX_Cycle_Offset2 field is absent in DTX2-Config IE and DTX_Cycle_Offset field in DTX-Config indicates a second integer value for DTX_Cycle) and If Static_Transmission_Period_Determination_2 field is configured for the primary DTX group (Static_Transmission_Period_Determination_2 field is present in DTX2-Config), The terminal applies Static_Transmission_Period_Determination_mode_2 for the primary DTX group.

If a first integer value is configured for long DTX cycle of the secondary DTX group (DTX_Cycle_Offset2 field is absent in DTX2-ConfigSecondary IE and DTX_Cycle_Offset field in DTX-Config indicates a first integer value for DTX_Cycle), The terminal applies Static_Transmission_Period_Determination_mode_1 for the secondary DTX group.

If a second integer value is configured for long DTX cycle of the secondary DTX group (DTX_Cycle_Offset2 field is absent in DTX2-ConfigSecondary IE and DTX_Cycle_Offset field in DTX-Config indicates a second integer value for DTX_Cycle) and If Static_Transmission_Period_Determination_2 field is not configured for the secondary DTX group, The terminal applies Static_Transmission_Period_Determination_mode_1 for the secondary DTX group.

If a second integer value is configured for long DTX cycle of the secondary DTX group (DTX_Cycle_Offset2 field is absent in DTX2-ConfigSecondary IE and DTX_Cycle_Offset field in DTX-Config indicates a second integer value for DTX_Cycle) and If Static_Transmission_Period_Determination_2 field is configured for the secondary DTX group (Static_Transmission_Period_Determination_2 field is present in DTX2-ConfigSecondary), The terminal applies Static_Transmission_Period_Determination_mode_2 for the secondary DTX group.

The first integer value is divisor of 10240 (i.e. 10, 20, 32, 40, 64, 80, 128, 160, 256, 320, 512, 640, 1024, 1280, 2048, 2560, 5120 or 10240). The second integer value is not divisor of 10240 (i.e. 60 or 70).

The terminal determines whether to use HARQ_PID_Determination_1 or HARQ_PID_Determination_2 for each configured grant.

If HARQ_PID_Determination_2 is absent in a configured_grant_base_configuration, the terminal applies HARQ_PID_Determination_mode_1 for configured grants. The configured grants are the grants configured by the configured_grant_base_configuration and associated configured_grant_additional_configurations.

If HARQ_PID_Determination_2 is present in a configured_grant_base_configuration, the terminal applies HARQ_PID_Determination_mode_2 for configured grants. The configured grants are the grants configured by the configured_grant_base_configuration and associated configured_grant_additional_configurations.

HARQ_PID_Determination_mode_1

The terminal determines the HARQ Process ID associated with the first symbol of a UL transmission based on the following equation HARQ Process ID=[floor(CURRENT_symbol/periodicity)] modulo nrofHARQ-Processes+harq-ProcID-Offset2, and CURRENT_symbol=(First_counter×numberOfSlotsPerFrame×numberOfSymbolsPerSlot+slot number in the frame×numberOfSymbolsPerSlot+symbol number in the slot)

The terminal determines the HARQ Process ID associated with the first symbol of a UL transmission based on the following equation HARQ Process ID=[floor(CURRENT_symbol/periodicity)] modulo nrofHARQ-Processes+harq-ProcID-Offset2, and CURRENT_symbol=(third_counter×firrst_count×numberOfSlotsPerFrame×numberOfSymbolsPerSlot+slot number in the frame×numberOfSymbolsPerSlot+symbol number in the slot)

During the DTX operation, the terminal starts Static_Transmission_Timer at a specific slot of a specific subframe of a specific frame of a specific big frame.

If Static_Transmission_Period_Determination_mode_1 is applied, the specific subframe and the specific frame are determined based on the following equation.

[(first_counter×10)+subframe number] modulo (DTXCycle)=DTXStartOffset

For both the primary DTX group and the secondary DTX group, first_counter is initialized to the frame_number when the terminal receives the system information. first_counter is incremented by one every radio frame.

subframe number is the number of subframe starting from 0.

The specific frame is determined from the first_counter fulfilling the equation. the specific subframe is determined from the subframe number fulfilling the equation.

For the primary DTX group, DTXCycle and DTXStartOffset are determined from DTX_Cycle_Offset field in the DTX-Config.

For the secondary DTX group, DTXCycle and DTX_Cycle_Offset are determined from DTX_Cycle_Offset field in the DTX-Config.

If Static_Transmission_Period_Determination_mode_2 is applied, the specific subframe and the specific frame and specific big frame are determined based on the following equation.

[second_counter*10240+(first_counter×10)+subframe number] modulo (DTXCycle)=DTXStartOffset The specific frame is determined from the first_counter and the second_counter that fulfil the equation. The specific subframe is determined from the subframe number fulfilling the equation.

For both the primary DTX group and the secondary DTX group, the second_counter is initialized to the BigFrameNumber when the terminal receives a RRCReconfiguration. The second_counter is incremented by one when first_counter wrap around to zero. A single second_counter is used both for the primary DTX group and for the secondary DTX group.

For the primary DTX group, DTXCycle and DTXStartOffset are determined from DTX_Cycle_Offset2 field in the DTX2-Config.

For the secondary DTX group, DTXCycle and DTXStartOffset are determined from DTX_Cycle_Offset2 field in the DTX2-ConfigSecondary.

alternative on_starting_point_determination_mode_2

In an alternative embodiment, if Static_Transmission_Period_Determination_mode_2 is applied, the terminal starts Static_Transmission_Timer at a first subframe. The terminal determines a Nth first subframe occurs in the subframe fulfilling the following equation.

[(first_counter×10)+subframe number]=(DTXReferenceFranmeNumber×10+DTXStartOffset+$N$×DTXCycle)modulo (10240)

For the primary DTX group, DTXCycle and DTXStartOffset are determined from DTX_Cycle_Offset2 field in the DTX2-Config.

For the secondary DTX group, DTXCycle and DTXStartOffset are determined from DTX_Cycle_Offset2 field in the DTX2-ConfigSecondary.

During DTX operation, the terminal starts Static_Transmission_Timer for a DTX group at a subframe. The terminal starts or restarts Dynamic_Transmission_Timer for a DTX group if PDCCH indicating new transmission is received on any serving cell of the DTX group during Static_Transmission_Period.

Static_Transmission_Period of a primary DTX group is the time period during when Static_Transmission_Timer for the primary DTX group is running. Static_Transmission_Period of a secondary DTX group is the time period during when Static_Transmission_Timer for the secondary DTX group is running. The length of Static_Transmission_Period is static. Static_Transmission_Period occurs periodically.

Dynamic_Transmission_Period of a primary DTX group is the time period during when Dynamic_Transmission_Timer for the primary DTX group is running and Static_Transmission_Timer for the primary DTX group is not running. Static_Transmission_Period of a secondary DTX group is the time period during when Dynamic_Transmission_Timer for the secondary DTX group is running and Static_Transmission_Timer for the secondary DTX group is not running. The length of Dynamic_Transmission_Period is dynamic. Dynamic_Transmission_Period occurs aperiodically.

Restricted_Transmission_Period_2 is the time period occurring periodically. The length of Restricted_Transmission_Period_2 is static. Restricted_Transmission_Period_2 is common to the primary DTX group and the secondary DTX group.

Restricted_Transmission_Period_3 is the time period occurring periodically. The length of Restricted_Transmission_Period_3 is static. Restricted_Transmission_Period_3 is common to the primary DTX group and the secondary DTX group.

Terminal performs uplink transmission for a first set of uplink signals in the primary DTX group during Static_Transmission_Period of the primary DTX group.

Terminal performs uplink transmission for a first set of uplink signals in the secondary DTX group during Static_Transmission_Period of the secondary DTX group.

Terminal performs uplink transmission for a second set of uplink signals in the primary DTX group during Dynamic_Transmission_Period of the primary DTX group.

Terminal performs uplink transmission for a second set of uplink signals in the secondary DTX group during Dynamic_Transmission_Period of the secondary DTX group.

Terminal performs uplink transmission for a third set of uplink signals in the primary DTX group and in the secondary DTX group during Restricted_Transmission_Period_2.

Terminal performs uplink transmission for a fourth set of uplink signals in the primary DTX group and in the secondary DTX group during Restricted_Transmission_Period_3.

Terminal performs uplink transmission for a fifth set of uplink signals in the primary DTX group during RTP of the primary DTX group.

Terminal performs uplink transmission for a fifth set of uplink signals in the secondary DTX group during RTP of the secondary DTX group.

The terminal performs configured grant transmission based on the configuration information included in the RRCReconfiguration If HARQ_PID_Determination_mode_2 is applied, the terminal applies BigFrameNumber and ReferenceFrameNumber2 in DTX3-Config IE to manage third_counter. Third_count is second_counter plus one. Or third_counter is initialized to one and the second_counter is initialized to zero. Allaternativiely, the second_counter is initialized to one. The second_counter is used both for Static_Transmission_Period and HARQ PID.

For each PDU_SET_arrival_cycle, the terminal determines which configured grants are to be used and which configured grants are to be unused.

At each CGI PUCCH occasion immediately before a PDU_SET_arrival_cycle, the terminal transmits CGI on a specific PUCCH resource. CGI PUCCH occasion is the slot where CGI on PUCCH is transmitted.

If the CGI PUCCH occasion partially or fully overlaps with Static_Transmission_Period of the primary DTX group, the terminal transmits CGI on PUCCH during Static_Transmission_Period of the primary DTX group.

If the CGI PUCCH occasion partially or fully overlaps with Dynamic_Transmission_Period of the primary DTX group, the terminal transmits CGI on PUCCH during Dynamic_Transmission_Period of the primary DTX group.

If the CGI PUCCH occasion partially or fully overlaps with Restricted_Transmission_Period_1 of the primary DTX group, the terminal transmits CGI on PUCCH during Restricted_Transmission_Period_1 of the primary DTX group.

If the CGI PUCCH occasion partially or fully overlaps with Restricted_Transmission_Period_2, the terminal transmits CGI on PUCCH during Restricted_Transmission_Period_2.

If the CGI PUCCH occasion partially or fully overlaps with Restricted_Transmission_Period_3, the terminal transmits CGI on PUCCH during Restricted_Transmission_Period_3 if CGI_PUCCH is present in DTX4-Config.

CGI comprises with one or more bits. Terminal determines the bit width of CGI based on the number of configured_grant_additional_configurations of an uplink bandwidth part. The uplink bandwidth part is the bandwidth part with most configured_grant_additional_configurations. The bit width of CGI is derived from the log 2 operation. For example, if 2 configured_grant_additonal_configurations are configured for UL BWP 1 and 5 for UL BWP 2, and if currently active UL BWP is UL BWP 1, terminal determines the bit width based on the number of configured_grant_additinoal_configuration of BWP 2 (not based on that of currently active UL BWP). The bit width (i.e., the number of bits) of CGI is 3 in this case.

The first bit of CGI corresponds to a configured grant in the currently active BWP of a specific serving cell. The corresponding configured grant is the configured grant associated with configured_grant_index2 of 0.

The second bit of CGI corresponds to a configured grant in the currently active BWP of a specific serving cell. The corresponding configured grant is the configured grant associated with configured_grant_index2 of 1. The specific serving cell is indicated in the CGI configuration.

If a bit has no corresponding configured_grant_additional_configuration in the currently active BWP, terminal sets the bit to a predefined value.

If the bit is set to a first value, the corresponding configured_grant_additional_configuration are to be used by the terminal in the corresponding PDU_SET_arrival_cycle (or until the next CGI PUCCH occasion).

If the bit is set to a second value, the corresponding configured_grant_additional_configuration are to be unused by the terminal in the corresponding PDU_SET_arrival_cycle (or until the next CGI PUCCH occasion).

The base station can assign to other terminals the resources unused by the terminal.

At some point of time, the base station determines to perform handover for the terminal to the second cell. The base station determines the configuration of the terminal in the second cell. The base station generates a third RRCReconfiguration message for handover towards the second cell.

In 2A-36, the base station transmits a third RRCReconfiguration to the terminal.

The third RRCReconfiguration includes the target cell information and DTX information to be applied by the terminal in the target cell.

In 2A-41, the terminal transmits RRCReconfigurationComplete in the second cell in response to the third RRCReconfiguration.

In 2A-46, the terminal receives a system information in the second cell. The system information inccludes frame_number field.

In 2A-51, the terminal and the base station perform DTX operation in the second cell.

The terminal and the base station determine the DTX parameters to be applied to the primary DTX group after handover as below.

If the third RRCReconfiguration includes DTX-Config field and DTX_Cycle_Offset2 field in DTX2-Config and Static_Transmission_Period_Determination_2 field in DTX3-Config,
- Terminal applies Static_Transmission_Period_Determination_mode_2 based on that Static_Transmission_Period_Determination_2 field is present in the third RRCReconfiguration; and
- Terminal applies DTX_Cycle_Offset2 field in the third RRCReconfiguration.

If the third RRCReconfiguration includes neither DTX-Config field nor DTX_Cycle_Offset2 field in DTX2-Config and if the third RRCReconfiguration includes Static_Transmission_Period_Determination_2 field in DTX3-Config,
- Terminal applies Static_Transmission_Period_Determination_mode_2 based on that Static_Transmission_Period_Determination_2 field is present in the third RRCReconfiguration; and
- Terminal applies DTX_Cycle_Offset2 field in the second RRCReconfiguration.

If the third RRCReconfiguration does not include DTX-Config field and if the third RRCReconfiguration includes DTX2-Config set to 'release' and if the third RRCReconfiguration includes Static_Transmission_Period_Determination_2 field in DTX3-Config,
- Terminal applies Static_Transmission_Period_Determination_mode_2 based on that Static_Transmission_Period_Determination_2 field is present in the third RRCReconfiguration.
- Terminal applies DTX_Cycle_Offset field in the second RRCReconfiguration.

If the third RRCReconfiguration does not include DTX-Config field and if the third RRCReconfiguration includes DTX2-Config set to 'release' and if the third RRCReconfiguration does not include Static_Transmission_Period_Determination_2 field in DTX3-Config,
- Terminal applies Static_Transmission_Period_Determination_mode_1 based on that Static_Transmission_Period_Determination_2 field is absent in the third RRCReconfiguration.
- Terminal applies DTX_Cycle_Offset field in the second RRCReconfiguration.

In short, the terminal applies, for DTX operation in the target cell, the DTX_Cycle_Offset2 that have been received (applied/used) in the old cell, if the RRC message instructing handover towards the target cell does not include the DTX_Cycle_Offset2. However, the terminal does not apply, for the DTX operation in the target cell, Static_Transmission_Period_Determination_2 that have been received (applied) in the old cell, even if the RRC message instructing handover towards the target cell does not include Static_Transmission_Period_Determination_2.

The reason why DTX_Cycle_Offset2 and Static_Transmission_Period_Determination_2 are handled differently is signaling efficiency. Since DTX_Cycle_Offset2 field is multi-bit information and Static_Transmission_Period_Determination_2 field is single bit information, signaling overhead reduction is achieved by reusing the stored value in case of DTX_Cycle_Offset2 field. However, for single bit information, reusing the stored value incur more overhead in case of releasing the value.

If the RRC message for handover from the first cell to the second cell include neither the first DTX parameter nor the second DTX parameter, The terminal applies in the second cell the first DTX parameter applied in the first cell and The terminanl applies in the second cell the second DTX parameter received in the second cell.

If the RRC message for handover from the first cell to the second cell does not include the second DTX parameter, The terminal does not apply in the second cell the first DTX parameter applied in the first cell and The terminal does not apply in the second cell the second DTX parameter applied in the first cell.

The terminal and the base station perform DTX operation based on the DTX parameters and the way how to determine the starting subframe of Static_Transmission_Timer.

The first DTX parameter is DTX_Cycle_Offset2 and the second DTX parameter is Static_Transmission_Period_Determination_2.

The terminal and the base station manage the first_counter and the second_counter as below.

The first_counter at a specific time holds system frame number at the specific time.

The second_counter at a specific time holds big frame number at the specific time. A big frame consists with 1024 radio frames.

The first_counter is initialized based on the value indicated in frame_number field when a system information containing frame_number field is received in a first cell.

The first_counter increments by one every radio frame.

When handover towards a second cell is executed, if the terminal is aware that the target cell and the source cell have SFN and frame boundary alignment, the terminal continues to use in the second cell the first_counter used in the first cell.

if the terminal is not aware that target cell and the source cell have SFN and frame boundary alignment, the terminal initializes the first_counter based on the value indicated in frame_number in the system information received in the second cell.

the terminal is indicated by the base station via a RRC message whether cells in a frequency layer have SFN alignment and frame boundary alignment.

The second_counter is initialized to one when DTX3-Config is received and the BigFrameNumber is not indicated in the DTX3-Config. >The second_counter is initialized to the value indicated in BigFrameNumber when DTX3-Config is received and the BigFrameNumber is indicated in the DTX3-Config.

The second_counter is updated based on ReferenceFrameNumber2 and the first SFN.

The first SFN is the frame number of the frame when RRC message containing DTX3-Config is received.

If the difference between ReferenceFrameNumber2 and first SFN is smaller than or equal to a specific integer (e.g. 256), the second_counter is not updated.

If the difference between ReferenceFrameNumber2 and first SFN is greater than the specific integer (e.g. 256), the second_counter is updated by one (updated second_counter=second_counter+1).

Upon MAC reset for handover, the terminal initializes the second_counter to one.

Upon Lower Layer Triggered Mobility (LTM) handover, the base station indicates the terminal whether to reset the second_counter to one or to continue to use the second_counter.

The indication can be sent in a MAC Control Element (CE) instructing LTM handover towards the second cell. If a specific field in the MAC CE is set to a first value, the terminal reset the second_counter at a point of time. If the specific field in the MAC CE is set to a second value, the terminal continues to use the second_counter in the second cell.

The point of time is after receiving the MAC CE in the first cell and before performing first uplink transmission in the second cell.

Figure 3A:
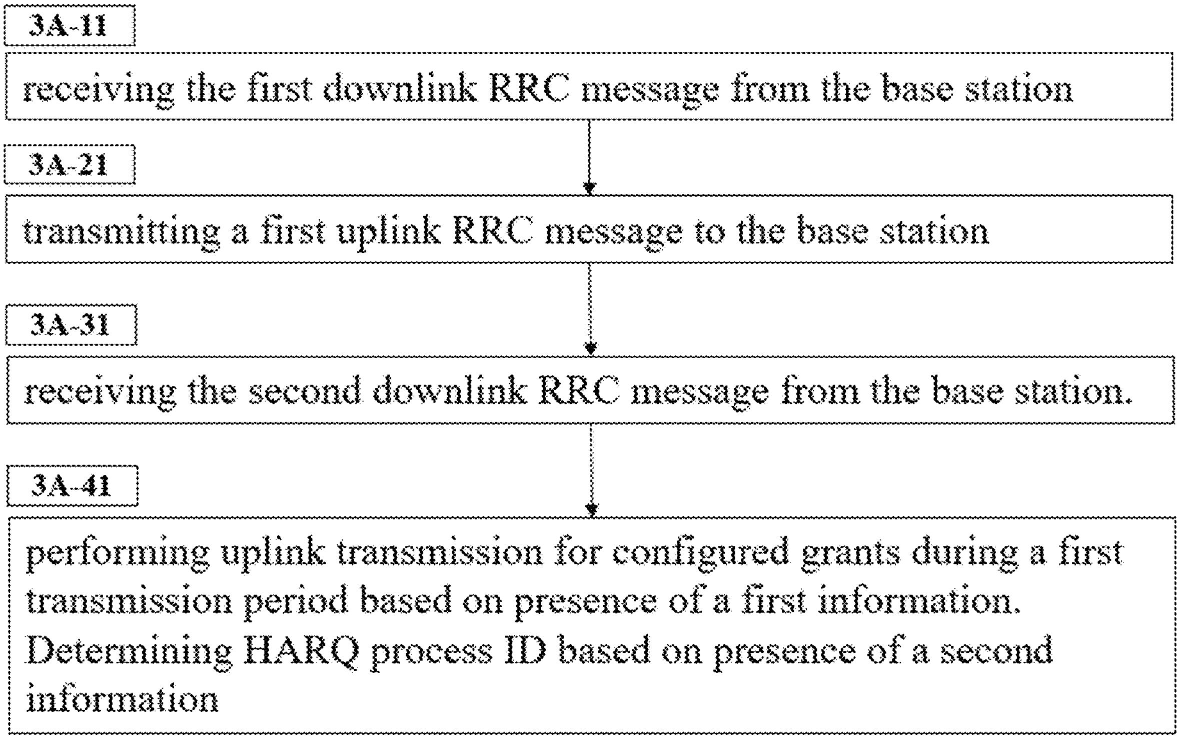
FIG. 3A is a flow diagram illustrating an DTX operation of the terminal.

FIG. 3A is a flow diagram illustrating an DTX operation of the terminal.

In 3A-11, the terminal receives the first downlink RRC message from the base station. The first downlink RRC message includes information related to an uplink traffic pattern report.

In 3A-21, the terminal transmits a first uplink RRC message (UEAssistanceInformation) to the base station. The first uplink RRC message includes information on an uplink traffic pattern.

In 3A-31, the terminal receives the second downlink RRC message from the base station. The second downlink RRC message includes one or more configured grant parameters.

In step 3A-41, the terminal performs uplink transmission for configured grants during a first transmission period (RTP2) based on presence of a first information (Allowed_Configured_Grant_List).

To perform uplink transmission for configured grants, the terminal determines HARQ process ID based on HARQ_PID_Determination_mode_1 if a second information (HARQ_PID_Determination_2) is absent in the configured grant configuration.

The terminal determines HARQ process ID based on HARQ_PID_Determination_mode_2 if a second information (HARQ_PID_Determination_2) is present in the configured grant configuration.

Figure 4A:
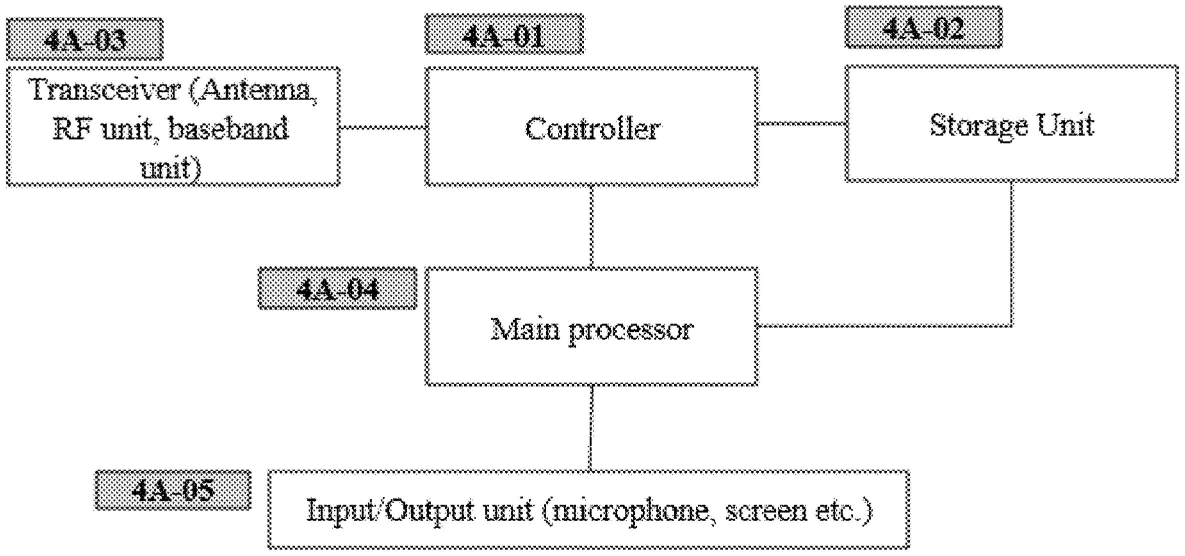
FIG. 4A is a block diagram illustrating the internal structure of a UE to which the disclosure is applied.

FIG. 4A is a block diagram illustrating the internal structure of a Terminal to which the disclosure is applied.

Referring to the diagram, the terminal includes a controller (4A-01), a storage unit (4A-02), a transceiver (4A-03), a main processor (4A-04) and I/O unit (4A-05).

The controller (4A-01) controls the overall operations of the terminal in terms of mobile communication. For example, the controller (4A-01) receives/transmits signals through the transceiver (4A-03). In addition, the controller (4A-01) records and reads data in the storage unit (4A-02). To this end, the controller (4A-01) includes at least one processor. For example, the controller (4A-01) may include a communication processor (CP) that performs control for communication and an application processor (AP) that controls the upper layer, such as an application program. The controller controls storage unit and transceiver such that UE operations illustrated in FIG. 2A and FIG. 3A are performed.

The storage unit (4A-02) stores data for operation of the terminal, such as a basic program, an application program, and configuration information. The storage unit (4A-02) provides stored data at a request of the controller (4A-01).

The transceiver (4A-03) consists of a RF processor, a baseband processor and plurality of antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mi10r, an oscillator, a digital-to-analog converter (DAC), an analog-to-digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor (4A-04) controls the overall operations other than mobile operation. The main processor (4A-04) process user input received from I/O unit (4A-05), stores data in the storage unit (4A-02), controls the controller (4A-01) for required mobile communication operations and forward user data to I/O unit (4A-05).

I/O unit (4A-05) consists of equipment for inputting user data and for outputting user data such as a microphone and a screen. I/O unit (4A-05) performs inputting and outputting user data based on the main processor's instruction.

Figure 4B:
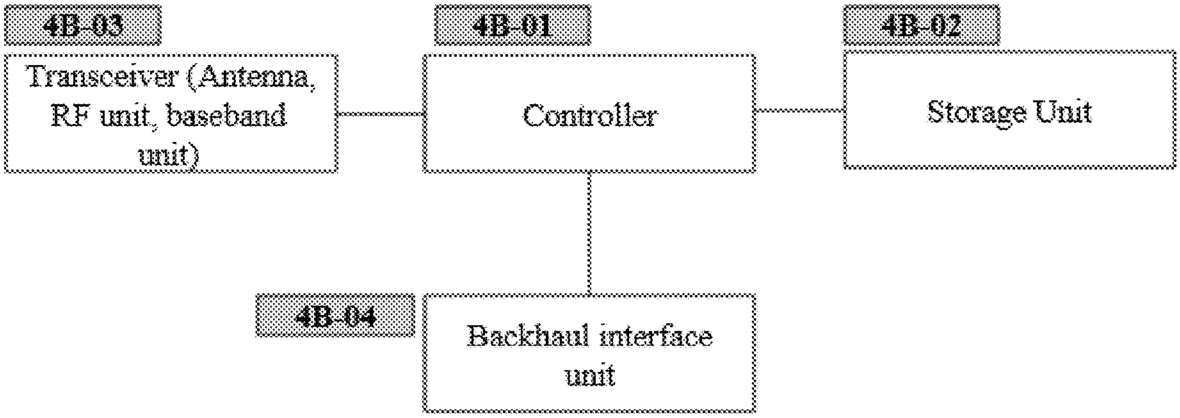
FIG. 4B is a block diagram illustrating the configuration of a base station according to the disclosure.

FIG. 4B is a block diagram illustrating the configuration of a base station according to the disclosure.

As illustrated in the diagram, the base station includes a controller (4B-01), a storage unit (4B-02), a transceiver (4B-03) and a backhaul interface unit (4B-04).

The controller (4B-01) controls the overall operations of the main base station. For example, the controller (4B-01) receives/transmits signals through the transceiver (4B-03), or through the backhaul interface unit (4B-04). In addition, the controller (4B-01) records and reads data in the storage unit (4B-02). To this end, the controller (4B-01) may include at least one processor. The controller controls transceiver, storage unit and backhaul interface such that base station operation illustrated in FIG. 2A are performed.

The storage unit (4B-02) stores data for operation of the main base station, such as a basic program, an application program, and configuration information. Particularly, the storage unit (4B-02) may store information regarding a bearer allocated to an accessed UE, a measurement result reported from the accessed UE, and the like. In addition, the storage unit (4B-02) may store information serving as a criterion to deter mine whether to provide the terminal with multi-connection or to discontinue the same. In addition, the storage unit (4B-02) provides stored data at a request of the controller (4B-01).

The transceiver (4B-03) consists of a RF processor, a baseband processor and plurality of antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mi10r, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit (4B-04) provides an interface for communicating with other nodes inside the network. The backhaul interface unit (4B-04) converts a bit string transmitted from the base station to another node, for example, another base station or a core network, into a physical signal, and converts a physical signal received from the other node into a bit string.

Below table lists acronym used in the present invention.

| Acronym | Full name | Acronym | Full name |
|---|---|---|---|
| 5GC | 5G Core Network | RACH | Random Access Channel |
| ACK | Acknowledgement | RAN | Radio Access Network |
| AM | Acknowledged Mode | RAR | Random Access Response |
| AMF | Access and Mobility Management Function | RA-RNTI | Random Access RNTI |
| ARQ | Automatic Repeat Request | RAT | Radio Access Technology |
| AS | Access Stratum | RB | Radio Bearer |
| ASN.1 | Abstract Syntax Notation One | RLC | Radio Link Control |
| BSR | Buffer Status Report | RNA | RAN-based Notification Area |
| BWP | Bandwidth Part | RNAU | RAN-based Notification Area Update |
| CA | Carrier Aggregation | RNTI | Radio Network Temporary Identifier |
| CAG | Closed Access Group | RRC | Radio Resource Control |
| CG | Cell Group | RRM | Radio Resource Management |
| C-RNTI | Cell RNTI | RSRP | Reference Signal Received Power |
| CSI | Channel State Information | RSRQ | Reference Signal Received Quality |
| DCI | Downlink Control Information | RSSI | Received Signal Strength Indicator |
| DRB | (user) Data Radio Bearer | SCell | Secondary Cell |
| DRX | Discontinuous Reception | SCS | Subcarrier Spacing |
| HARQ | Hybrid Automatic Repeat Request | SDAP | Service Data Adaptation Protocol |
| IE | Information element | SDU | Service Data Unit |
| LCG | Logical Channel Group | SFN | System Frame Number |
| MAC | Medium Access Control | S-GW | Serving Gateway |
| MIB | Master Information Block | SI | System Information |
| NAS | Non-Access Stratum | SIB | System Information Block |

-continued

| Acronym | Full name | Acronym | Full name |
|---|---|---|---|
| NG-RAN | NG Radio Access Network | SpCell | Special Cell |
| NR | NR Radio Access | SRB | Signalling Radio Bearer |
| PBR | Prioritised Bit Rate | SRS | Sounding Reference Signal |
| PCell | Primary Cell | SS | Search Space |
| PCI | Physical Cell Identifier | SSB | SS/PBCH block |
| PDCCH | Physical Downlink Control Channel | SSS | Secondary Synchronisation Signal |
| PDCP | Packet Data Convergence Protocol | SUL | Supplementary Uplink |
| PDSCH | Physical Downlink Shared Channel | TM | Transparent Mode |
| PDU | Protocol Data Unit | UCI | Uplink Control Information |
| PHR | Power Headroom Report | UE | User Equipment |
| PLMN | Public Land Mobile Network | UM | Unacknowledged Mode |
| PRACH | Physical Random Access Channel | CRP | Cell Reselection Priority |
| PRB | Physical Resource Block | FPP | First positioning protocol |
| PSS | Primary Synchronisation Signal | SPP | Second positioning protocol |
| PUCCH | Physical Uplink Control Channel | DL-PRS | Downlink-Positioning Reference Signal |
| PUSCH | Physical Uplink Shared Channel | SL-PRS | Sidelink-Positioning Reference Signal |
| DL-AoD | Downlink Angle-of-Departure | | |
| GNSS | Global Navigation Satellite System | | |

What is claimed is:

1. A method performed by a terminal, the method comprising:

receiving, by the terminal from a base station, a first radio resource control (RRC) message, wherein the first RRC message comprises a set of parameters related to a Configured Grant (CG);

determining, by the terminal and based on the set of parameters, a Hybrid Automatic Repeat reQuest (HARQ) process identifier;

performing, by the terminal and based on the determined HARQ process identifier, C-based Physical Uplink Shared Channel (PUSCH) transmission, wherein the HARQ process identifier is determined based on a first equation in a case that a specific parameter is comprised in the set of parameters related to the CG, wherein the HARQ process identifier is determined based on a second equation in a case that the specific parameter is not comprised in the set of parameters related to the CG, wherein the first equation comprises a first variable and a second variable, and wherein the second equation comprises the first variable and does not comprise the second variable;

receiving, by the terminal from the base station, a second RRC message, wherein the second RRC message comprises a second set of parameters related to a first period; and performing, by the terminal and based on the determined HARQ process identifier and the second set of parameters, the CG-based PUSCH transmission, wherein the terminal performs, outside of the first period, the CG-based PUSCH transmission, wherein the terminal does not perform, during the first period, the CG-based PUSCH transmission, wherein the second set of parameters comprises:

a parameter indicating a length of the first period; and a parameter indicating a cycle of the first period.

2. The method of claim 1, wherein the first variable is determined based on a parameter in system information and the second variable is determined based on a parameter in an RRC message.

3. The method of claim 1, wherein the first variable increments by one every radio frame and the second variable does not increment every radio frame.

4. The method of claim 3, wherein the second variable increments by one every specific time duration.

5. The method of claim 1, wherein the set of parameters related to the CG comprises:

a first subset of parameters related to a frequency resource; and a second subset of parameters related to a time resource, and wherein two or more configured grants are configured based on the first subset of parameters and the second subset of parameters.

6. The method of claim 5, wherein each of the two or more configured grants occurs periodically.

7. The method of claim 5, wherein the first subset of parameters comprises a parameter related to a frequency resource that determines a frequency resource of the two or more configured grants.

8. The method of claim 5, wherein a number of the two or more configured grants is determined based on the second subset of parameters.

9. The method of claim 5, wherein a time resource of each of the two or more configured grants is determined based on the second subset of parameters.

10. The method of claim 5, wherein:

all of the two or more configured grants are configured in a same frequency resource that is determined based on the first subset of parameters; and each of the two or more configured grants is configured in a time resource that is different from each other and determined based on the second subset of parameters.

11. The method of claim 5, wherein the first subset of parameters further comprises a parameter related to a number of HARQ processes for determining a HARQ process identifier of each of the two or more configured grants.

12. The method of claim 5, wherein the first subset of parameters further comprises:

a parameter related to a Modulation and Coding Scheme (MCS) table that is commonly applied to the two or more configured grants.

13. The method of claim 5, wherein the first subset of parameters further comprises a parameter related to periodicity.

14. The method of claim 5, wherein a single configured grant is configured based on the first subset of parameters in a case that the set of parameters related to the CG:

comprises a first subset of parameters related to a frequency resource; and does not comprise a second subset of parameters related to a time resource.

15. The method of claim 14, wherein the single configured grant occurs periodically.

16. The method of claim 1, wherein the first period occurs periodically based on the parameter indicating a cycle of the first period.

17. The method of claim 1, wherein the first period has a constant duration that is determined based on the parameter indicating a length of the first period.

18. A terminal comprising:

a transceiver, a memory, and a controller coupled to the transceiver and the memory, wherein the controller is configured to cause the terminal to:

receive, from a base station, a first radio resource control (RRC) message, wherein the first RRC message comprises a set of parameters related to a Configured Grant (CG);

determine, based on the set of parameters, a Hybrid Automatic Repeat reQuest (HARQ) process identifier;

perform, based on the determined HARQ process identifier, CG-based Physical Uplink Shared Channel (PUSCH) transmission, wherein the HARQ process identifier is determined based on a first equation in a case that a specific parameter is comprised in the set of parameters related to the CG, wherein the HARQ process identifier is determined based on a second equation in a case that the specific parameter is not comprised in the set of parameters related to the CG, wherein the first equation comprises a first variable and a second variable, and wherein the second equation comprises the first variable and does not comprise the second variable;

receive, from the base station, a second RRC message, wherein the second RRC message comprises a second set of parameters related to a first period; and perform, based on the determined HARQ process identifier and the second set of parameters, the CG-based PUSCH transmission, wherein the terminal performs, outside of the first period, the CG-based PUSCH transmission, wherein the terminal does not perform, during the first period, the CG-based PUSCH transmission, wherein the second set of parameters comprises:

a parameter indicating a length of the first period; and a parameter indicating a cycle of the first period.

* * * * *